United States Patent
Licht et al.

(10) Patent No.: US 6,552,119 B1
(45) Date of Patent: Apr. 22, 2003

(54) LATENT CROSS-LINKING AQUEOUS DISPERSIONS CONTAINING POLYURETHANE

(75) Inventors: Ulrike Licht, Mannheim (DE); Karl Häberle, Speyer (DE); Eckehardt Wistuba, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/744,977

(22) PCT Filed: Aug. 6, 1999

(86) PCT No.: PCT/EP99/05706

§ 371 (c)(1),
(2), (4) Date: Feb. 15, 2001

(87) PCT Pub. No.: WO00/11060

PCT Pub. Date: Mar. 2, 2000

(30) Foreign Application Priority Data

Aug. 18, 1998 (DE) .......................................... 198 37 377

(51) Int. Cl.$^7$ ............................. C08J 3/00; C08K 3/20; C08L 75/00
(52) U.S. Cl. ..................... 524/589; 524/507; 524/591; 524/839; 524/840
(58) Field of Search ................................. 524/507, 589, 524/591, 839, 840

(56) References Cited

U.S. PATENT DOCUMENTS

| | | |
|---|---|---|
| 4,113,676 A | 9/1978 | Niederst |
| 4,663,377 A | 5/1987 | Hombach et al. |
| 4,910,339 A | * 3/1990 | Henning et al. |
| 4,977,219 A | 12/1990 | Watson, Jr. |
| 5,117,059 A | 5/1992 | Tylor |
| 5,574,083 A | 11/1996 | Brown et al. |

FOREIGN PATENT DOCUMENTS

| | | |
|---|---|---|
| DE | 24 46 440 | 4/1976 |
| DE | 197 33 044 | 2/1999 |
| DE | 198 28 251 | 12/1999 |
| EP | 0 198 343 | 10/1986 |
| EP | 0 206 059 | 12/1986 |
| EP | 0 368 375 | 5/1990 |
| EP | 0 792 908 | 9/1997 |
| WO | WO 99/06460 | 2/1999 |

* cited by examiner

Primary Examiner—Patrick D. Niland
(74) Attorney, Agent, or Firm—Oblon, Spivak, McClelland, Maier & Neustadt, P.C.

(57) ABSTRACT

A latent-crosslinking aqueous polyurethane dispersion comprises

I) a disperse phase (P.I) including
   Ia) a polyurethane (Ia) which has hydrophilic groups which make it dispersible in water and also has carbodiimide groups but essentially no carboxyl groups or
   Ib) a physical mixture of
      Ibi) a polyurethane (Ibi) which has hydrophilic-groups which make it dispersible in water but has essentially no carbodiimide or carboxyl groups and
      Ibii) a carbodiimide (Ibii) which has essentially no hydrophilic groups which make it dispersible in water
II) a coherent aqueous phase (P.II) including in dissolved form a polycarboxylic acid II which has no carbodiimide groups but has a solubility of at least 1 g/l at 25° C. in the coherent aqueous phase P.II.

37 Claims, No Drawings

LATENT CROSS-LINKING AQUEOUS DISPERSIONS CONTAINING POLYURETHANE

Latent-crosslinking aqueous polyurethane dispersions comprising

I) a disperse phase (P.I) including
  Ia) a polyurethane (Ia) which has hydrophilic groups which make it dispersible in water and also has carbodiimide groups but essentially no carboxyl groups or
  Ib) a physical mixture of
    Ibi) a polyurethane (Ibi) which has hydrophilic groups which make it dispersible in water but has essentially no carbodiimide or carboxyl groups and
    Ibii) a carbodiimide (Ibii) which has essentially no hydrophilic groups which make it dispersible in water and
II) a coherent aqueous phase (P.II) including in dissolved form a polycarboxylic acid which has no carbodiimide groups but has a solubility of at least 1 g/l at 25° C. in the coherent aqueous phase P.II.

The invention additionally relates to the use of the aqueous dispersions of the invention as impregnants, coating compositions or adhesives and to the impregnated, coated or adhesively bonded articles produced using these dispersions.

Aqueous dispersions comprising a polyurethane in dispersed form are widely known. In order that coatings produced from the polyurethane have particularly good mechanical properties, a crosslinking component is added to these dispersions. What is desired in particular here is for the crosslinker to bring about the build up in the molecular weight of the polyurethane only once the polyurethane dispersion has, following its application to the workpiece to be coated, already formed a film. Under these circumstances, films are obtained whose cohesion is particularly high, since in this case the polymer molecules of one dispersion particle can also be linked by a covalent bond to the polymer molecules of another, adjacent dispersion particle.

In the field of adhesives, for example, particularly good film cohesion is necessary in particular when the adhesive bond is subjected to mechanical loading accompanied by the action of heat.

To obtain adhesive bonds of sufficient strength even under such conditions, it has been recommended, in EP-A-206059, for example, to add a water-emulsifiable polyisocyanate as a crosslinker to the dispersions a short time before their processing as an adhesive.

The disadvantage of these two-component or two-pack systems, however, is that the pot life—that is the period within which these systems can be processed after they have been mixed—is severely restricted. Since, moreover, the two-component system cannot be stored for a long period and the processor has to carry out the extra step of preparing a defined quantity of adhesive which can be processed in the course of one working cycle, the effort which needs to be made by the adhesives processor in the case of two-component systems is higher than in the case of one-component systems.

U.S. Pat. Nos. 4,977,219 and 5,117,059 disclose mixtures of an aqueous dispersion of a carbodiimide and an aqueous dispersion of an emulsion polymer having carboxylate groups, the former dispersion being stabilized with the aid of customary surface-active substances.

U.S. Pat. No. 5,574,083 relates to a mixture of an aqueous dispersion of carbodiimides, said dispersion being stabilized by means of hydrophilic polyalkylene oxide radicals carried by the carbodiimides. These dispersions are blended with aqueous dispersions of an emulsion polymer having carboxylate groups.

EP-A-792908 discloses mixtures of an aqueous dispersion of a carboxyl-carrying polyurethane and an aqueous dispersion of a carbodiimide, the dispersion being stabilized with the aid of customary surface-active substances.

According to the teaching of the 4 abovementioned documents, the carbodiimides bring about an increase in the molecular weight of the carboxyl-containing polymers with which they are blended. The strength of adhesive bonds produced using these dispersions, especially under hot conditions, however, leaves much to be desired. Furthermore, the pot life of such mixtures is limited.

German Patent Application 19733044.4, unpublished at the priority date of the present invention, relates to aqueous dispersions of a polyurethane which carries carbodiimide groups.

German Patent Application 19828251.6, unpublished at the priority date of the present invention, relates to aqueous dispersions comprising 1. a disperse phase which comprises a polyurethane having carbodiimide groups or comprises a mixture of polyurethane and another polymer having carbodiimide groups, and 2. a further disperse phase which comprises a polymer having carboxyl groups.

It is therefore an object of the present invention to provide a further one-component polyurethane dispersion which does not have the disadvantages of the prior art. In particular, such dispersions should have good storage stability and should allow the production of heat-resistant adhesive bonds.

We have found that this object is achieved by the aqueous dispersions defined at the outset.

The disperse phase P.I generally contains from 0.01 to 1, preferably from 0.1 to 0.5, and, with particular preference, from 0.15 to 0.4 mol of carbodiimide groups per kg of monomers employed for the synthesis of the polyurethanes Ia or, respectively, Ibi and Ibii.

Suitable polyurethanes (Ia) are described, for example, in EP-A-792908.

In principle, suitable polyurethanes (Ia) are all hydrophilic polyurethanes whose synthesis involves the use of monomers having carbodiimide structural units. The carbodiimide structural units are introduced into the polyurethane (Ia) preferably by way of polyisocyanates (Ia1.1) comprising one or more of the carbodiimide structural units. Such polyisocyanates (Ia1.1) conform preferably to the general formula Ia1.1.1

$$OCN-(R^c-N=C=N)_n-R^c-NCO \qquad (Ia1.1.1)$$

where $R^c$ is a divalent hydrocarbon radical with or without urea, urethane, ester, and/or ether groups, as is obtained by removing the isocyanate groups from a simple organic isocyanate or from a prepolymer which carries terminal isocyanate groups and has urethane groups with or without ether or ester groups and where, if there are two or more radicals $R^c$ in the same molecule, it is also possible for different radicals $R^c$ meeting said definition to be present simultaneously, and n is an integral or (on average) fractional number from 1 to 20, preferably from 2 to 10.

The carbodiimide structural units are introduced into the polyurethane (Ia) with particular preference by way of polyisocyanates of the general formula Ia1.1.2

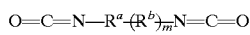

where $R^a$ is a group of the formula Ia1.1.2.1

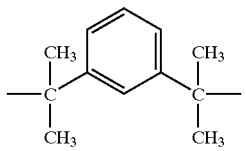

$R^b$ is a group of the formula Ia1.1.2.2

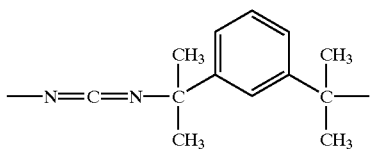

and m is a number from 1 to 20.

In general, the polyurethanes (Ia) are otherwise built up from

Ia1) diisocyanates which comprise
 Ia1.1) carbodiimide structural units and, if desired, those which
 Ia1.2) are free from carbodiimide structural units,
Ia2) diols of which
 Ia2.1) from 10 to 100 mol-%, based on the overall amount of the diols (Ia2), have a molecular weight from 500 to 5000 and
 Ia2.2) from 0 to 90 mol-%, based on the overall amount of the diols (Ia2), have a molecular weight from 60 to 500 g/mol,
Ia3) monomers which are different from the monomers (Ia1) and (Ia2) and have at least one isocyanate group or at least one isocyanate-reactive group and also at least one hydrophilic group or a potentially hydrophilic group which makes the polyurethanes dispersible in water,
Ia4) if desired, other polyfunctional compounds, different from the monomers (Ia1) to (Ia3), having reactive groups which are alcoholic hydroxyl groups, primary or secondary amino groups or isocyanate groups, and
Ia5) if desired, monofunctional compounds, different from the monomers (Ia1) to (Ia4), having a reactive group which is an alcoholic hydroxyl group, a primary or secondary amino group or an isocyanate group.

Suitable diisocyanatocarbodiimides (Ia1.1) are, in particular, those of the general formula Ia1.1.1 or Ia1.1.2.

The radicals $R^c$ in formula Ia1.1.1 are preferably derived by abstracting the isocyanate groups from monomers (Ia1.2), which are the diisocyanates commonly employed in polyurethane chemistry.

As monomers (Ia1.2) particular mention may be made of diisocyanates $X(NCO)_2$, where X is an aliphatic hydrocarbon radical with 4 to 12 carbons, a cycloaliphatic or aromatic hydrocarbon radical with 6 to 15 carbons or an araliphatic hydrocarbon radical with 7 to 15 carbons. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), such as the trans/trans, the cis/cis and the cis/trans isomer, and mixtures of these compounds.

The radicals $R^c$ derived by abstracting the isocyanate groups from a prepolymer having urethane groups and terminal isocyanate groups with or without ether or ester groups are preferably those built up from the diols (Ia2) and the diisocyanates (Ia1.2).

The preparation of the monomers (Ia1.1) is known per se and is described, for example, in U.S. Pat. Nos. 2,840,589 and 2,941,966, in EP-A-628 541, and by P. W. Campbell and K. C. Smeltz in Journal of Organic Chemistry 28 (1963) 2069. Diisocyanatocarbodiimides can also be prepared in a particularly gentle manner and free from byproducts by a heterogeneous catalysis as detailed in DE-A-2 504 400 and DE-A-2 552 350. The carbodiimidization of diisocyanates in the presence of very small amounts of phospholine oxide with subsequent blocking of the catalyst with acid chlorides is described in DE-A-2 653 120.

In general the diisocyanates (Ia1.2) are employed not only to prepare the diisocyanates (Ia1.1) but also, directly, for the synthesis of the polyurethanes present in polyurethane dispersions of the invention, since in many cases more isocyanate is required to synthesize the polyurethanes than is necessary to introduce the carbodiimide groups.

For synthesizing the polyurethanes it is possible as compounds (Ia1.2) to employ not only the abovementioned diisocyanates but also isocyanates which in addition to the free isocyanate groups have further, blocked isocyanate groups, examples being uretdione groups.

From the standpoint of good film forming and elasticity, suitable diols (Ia2) are ideally those of relatively high molecular mass (Ia2.1), having a molecular weight from about 500 to 5000, preferably from about 1000 to 3000 g/mol.

The diols (Ia2.1) are, in particular, polyesterpolyols which are known, for example, from Ullmanns Encyklopädie der technischen Chemie, 4th Edition, Volume 19, pp. 62 to 65. Preference is given to the use of polyesterpolyols obtained by reacting dihydric alcohols with dibasic carboxylic acids. In place of the free polycarboxylic acids it is also possible to use the corresponding polycarboxylic anhydrides or corresponding polycarboxylic esters of lower alcohols, or mixtures thereof, in order to prepare the polyesterpolyols. The polycarboxylic acids may be aliphatic, cycloaliphatic, araliphatic, aromatic or heterocyclic and may be unsubstituted or substituted, for example, by halogen atoms, and/or unsaturated. Examples of such acids are suberic, azelaic, phthalic and isophthalic acid, phthalic, tetrahydrophthalic, hexahydrophthalic, tetrachlorophthalic, endomethylenetetrahydrophthalic and glutaric anhydride, maleic acid, maleic anhydride, fumaric acid and dimeric fatty acids. Preference is given to dicarboxylic acids of the general formula $HOOC—(CH_2)_y—COOH$, where y is a number from 1 to 20, preferably an even number from 2 to 20, examples being succinic, adipic, sebacic and dodecanedicarboxylic acid.

Examples of suitable polyhydric alcohols are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis (hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. Preferred alcohols are of the general formula HO—$(CH_2)_x$—OH, where x is a number from 1 to 20, preferably an even number from 2 to 20. Examples are ethylene glycol, butane-1,4-diol, hexane-1,6-diol, octane-1, 8-diol and dodecane-1,12-diol. Neopentyl glycol is additionally preferred.

Also suitable are polycarbonatediols as can be obtained, for example, by reacting phosgene with an excess of the low molecular mass alcohols mentioned as structural components for the polyesterpolyols.

Lactone-based polyesterdiols are also suitable, these being homopolymers or copolymers of lactones, preferably hydroxyl-terminated adducts of lactones with suitable difunctional starter molecules. Preferred lactones are those derived from compounds of the general formula HO—$(CH_2)_z$—COOH, where z is a number from 1 to 20 and one hydrogen atom of a methylene unit can also be substituted by a $C_1$–$C_4$-alkyl radical. Examples are epsilon-caprolactone, beta-propiolactone, gamma-butyrolactone and/or methyl-epsilon-caprolactone, and mixtures thereof. Examples of suitable starter components are the low molecular mass dihydric alcohols mentioned above as structural components for the polyesterpolyols. The corresponding polymers of epsilon-caprolactone are particularly preferred. Lower polyesterdiols or polyetherdiols can also be used as starters for preparing the lactone polymers. In place of the lactone polymers it is also possible to employ the corresponding, chemically equivalent polycondensation products of the hydroxy carboxylic acids corresponding to the lactones.

Other suitable monomers (Ia2.1) are polyetherdiols. These can be obtained in particular by polymerizing ethylene oxide, propylene oxide, butylene oxide, tetrahydrofuran, styrene oxide or epichlorohydrin with itself in the presence, for example, of $BF_3$, or by carrying out addition reactions of these compounds, optionally as a mixture or in succession, with starter components containing reactive hydrogen atoms, such as alcohols or amines, examples being water, ethylene glycol, propane-1,2-diol, propane-1,3-diol, 1,2-bis(4-hydroxydiphenyl)propane, or aniline. Particular preference is given to polytetrahydrofuran having a molecular weight from 240 to 5000 and, in particular, from 500 to 4500.

Likewise suitable are polyhydroxyolefins, preferably those having 2 terminal hydroxyl groups, examples being alpha,omega-dihydroxypolybutadiene, alpha,omega-dihydroxypolymethacrylates or alpha,omega-dihydroxypolyacrylates, as monomers (Ia2.1). Such compounds are known, for example, from EP-A-0622378. Further suitable polyols are polyacetals, polysiloxanes and alkyd resins.

The polyols can also be employed as mixtures in a ratio of from 0.1:1 to 1:9.

The hardness and modulus of elasticity of the polyurethanes can be increased if the diols (Ia2) employed include not only the diols (Ia2.1) but also low molecular mass diols (Ia2.2), having a molecular weight from about 62 to 500, preferably from 62 to 200 g/mol.

As monomers (Ia2.2) use is made in particular of the structural components of the short-chain alkanediols specified for the preparation of polyesterpolyols, with preference being given to unbranched diols with even carbon numbers from 2 to 12 and also to pentane-1,5-diol and neopentyl glycol.

The proportion of the diols (Ia2.1), based on the overall amount of the diols (Ia2), is preferably from 10 to 100 mol % and the proportion of the monomers (Ia2.2), based on the overall amount of the diols (Ia2), is from 0 to 90 mol %. With particular preference the ratio of the diols (Ia2.1) to the monomers (Ia2.2) is from 0.1:1 to 5:1, more preferably from 0.2:1 to 2:1.

In order to render the polyurethanes dispersible in water they are composed not only of components (Ia1) and (Ia2) but also of monomers (Ia3), which are different from components (Ia1) and (Ia2) and have at least one isocyanate group or at least one isocyanate-reactive group and, in addition, at least one hydrophilic group or a group which can be converted into a hydrophilic group. In the text below, the phrase "hydrophilic groups or potentially hydrophilic groups" is abbreviated to "(potentially) hydrophilic groups". The (potentially) hydrophilic groups react with isocyanates substantially more slowly than do the functional groups of the monomers used to synthesize the polymer main chain.

The proportion of components having (potentially) hydrophilic groups among the total components (Ia1), (Ia2), (Ia3), (Ia4) and (Ia5) is generally such that the molar amount of the (potentially) hydrophilic groups, based on the amount by weight of all monomers (Ia1) to (Ia5), is from 30 to 1000, preferably from 50 to 500 and, with particular preference, from 80 to 300 mmol/kg.

The (potentially) hydrophilic groups may be nonionic or, preferably, (potentially) ionic hydrophilic groups.

Particularly suitable nonionic hydrophilic groups are poly ($C_1$–$C_4$-alkylene) glycol ethers comprising preferably from 5 to 100, more preferably from 10 to 80, repeating ethylene oxide units. The content of polyethylene oxide units is generally from 0 to 10, preferably from 0 to 6, % by weight, based on the amount by weight of all monomers (Ia1) to (Ia5).

Preferred monomers with nonionic hydrophilic groups are polyethylene oxide diols, polyethylene oxide monools, and the reaction products of a polyethylene glycol and a diisocyanate which have a terminally etherified polyethylene glycol radical. Diisocyanates of this kind and processes for their preparation are given in U.S. Pat. Nos. 3,905,929 and 3,920,598.

Ionic hydrophilic groups are, in particular, anionic groups, such as the sulfonate, the carboxylate and the phosphate group, in the form of their alkali metal or ammonium salts, and also cationic groups such as ammonium groups, especially protonated tertiary amino groups or quatenary ammonium groups.

Potentially ionic hydrophilic groups are, in particular, those which by simple neutralization or hydrolysis reactions can be converted into the abovementioned ionic hydrophilic groups, examples therefore being carboxylic acid groups.

(Potentially) ionic monomers (Ia3) are described at length in, for example, Ullmanns Encyklopädie der technischen Chemie, 4th Edition, Volume 19, pp. 311–313 and, for example, in DE-A 1 495 745.

(Potentially) cationic monomers (Ia3) of particular importance in practice are monomers containing tertiary amino groups, examples being tris(hydroxyalkyl)amines, N,N'-bis (hydroxyalkyl)alkylamines, N-hydroxyalkyldialkylamines, tris(aminoalkyl)amines, N,N'-bis(aminoalkyl)alkylamines and N-aminoalkyldialkylamines, where the alkyl and alkanediyl moieties of these tertiary amines consist independently of one another of from 1 to 6 carbon atoms.

These tertiary amines are converted into the ammonium salts either using acids, preferably strong mineral acids such as phosphoric acid, sulfuric acid or hydrohalic acids, or strong organic acids, or by reaction with suitable quaternizing agents, such as $C_1$–$C_6$-alkyl halides or benzyl halides, e.g., bromides or chlorides.

Suitable monomers having (potentially) anionic groups are usually aliphatic, cycloaliphatic, araliphatic or aromatic carboxylic and sulfonic acids which have at least one alcoholic hydroxyl group or at least one primary or secondary amino group. Preference is given to dihydroxyalkylcarboxylic acids, especially those with 3 to 10 carbon atoms, as are described in U.S. Pat. No. 3,412,054. Particularly preferred compounds are those of the general formula (Ia3.1)

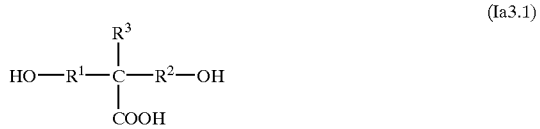

(Ia3.1)

in which $R^1$ and $R^2$ are a $C_1$–$C_4$-alkanediyl unit and $R^3$ is a $C_1$–$C_4$-alkyl unit, and especially dimethylolpropionic acid (DMPA).

Corresponding dihydroxy sulfonic acids and dihydroxy phosphonic acids, such as 2,3-dihydroxypropanephosphonic acid, are also suitable.

Other compounds which are suitable are dihydroxyl compounds with a molecular weight of more than 500 to 10,000 g/mol and at least 2 carboxylate groups, as are known from DE-A 3 911 827. They are obtainable by reacting dihydroxyl compounds with tetracarboxylic dianhydrides, such as pyromellitic dianhydride or cyclopentanetetracarboxylic dianhydride, in a molar ratio of from 2:1 to 1.05:1 in a polyaddition reaction. Particularly suitable dihydroxyl compounds are the monomers (IIa2) listed as chain extenders and also the diols (IIa1).

Suitable monomers (Ia3), having isocyanate-reactive amino groups, are amino carboxylic acids, such as lysine, β-alanine, or the adducts mentioned in DE-A-2 034 479 of aliphatic diprimary diamines with α,β-unsaturated carboxylic or sulfonic acids.

Such compounds conform, for example, to the formula (Ia3.2)

(Ia3.2)

where $R^4$ and $R^5$ independently of one another are a $C_1$–$C_6$-alkanediyl unit, preferably ethylene, and X is COOH or $SO_3H$.

Particularly preferred compounds of the formula (Ia3.2) are N-(2-aminoethyl)-2-aminoethanecarboxylic acid and N-(2-aminoethyl)-2-aminoethanesulfonic acid, or the corresponding alkali metal salts, in which Na is the particularly preferred counterion.

Particular preference is also given to the adducts of the abovementioned aliphatic diprimary diamines with 2-acrylamido-2-methylpropanesulfonic acid, as are described, for example, in DE-C 1 954 090.

Where monomers having potentially ionic groups are employed, they can be converted into the ionic form prior to, during, or preferably after the isocyanate polyaddition reaction, since the ionic monomers are in many cases of only poor solubility in the reaction mixture. With particular preference, the sulfonate or carboxylate groups are in the form of their salts with an alkali metal ion or an ammonium ion as counterion.

In the case of the use of monomers (Ia3) having carboxyl groups or having groups which can be converted into carboxyl groups by hydrolysis reactions or by protonation of carboxylate groups following the dispersion of the polyurethanes, the pH of the aqueous dispersion of the invention is set to such a level within the basic range that there are essentially no more carboxyl groups and, instead, the latter have undergone virtually complete neutralization. This is generally the case for pH $\gg pK_a$, where: $pH = pK_a - \log c_{acid}/c_{salt}$.

Preferably, the pH is at least 8.

The monomers (Ia4), which are different from the monomers (Ia1) to (Ia3), serve in general for crosslinking or for chain extension. They are generally more than difunctional nonphenolic alcohols, amines having 2 or more primary and/or secondary amino groups, and compounds having not only one or more alcoholic hydroxyl groups but also one or more primary and/or secondary amino groups.

Alcohols with a functionality of more than 2 which can be used to establish a certain degree of branching or crosslinking are, for example, trimethylolpropane, glycerol and sucrose.

Also suitable are monoalcohols which in addition to the hydroxyl group have a further isocyanate-reactive group, such as monoalcohols having one or more primary and/or secondary amino groups, an example being monoethanolamine.

Polyamines having 2 or more primary and/or secondary amino groups are employed in particular when the chain extension or crosslinking is to take place in the presence of water, since amines generally react faster with isocyanates than do alcohols or water. This is frequently necessary when aqueous dispersions of crosslinked polyurethanes or polyurethanes of high molecular weight are desired. In such cases, the procedure is to prepare prepolymers having isocyanate groups, to disperse them rapidly in water and then, by adding compounds having two or more isocyanate-reactive amino groups, to carry out chain extension or crosslinking.

Amines suitable for this purpose are, in general, polyfunctional amines from the molecular weight range from 32 to 500 g/mol, preferably from 60 to 300 g/mol, which contain at least two amino groups selected from the group of primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate, or triamines, such as diethylenetriamine or 1,8-diamino-4-aminomethyloctane.

The amines can also be employed in blocked form, for example, in the form of the corresponding ketimines (see e.g. CA-A-1 129 128), ketazines (cf. e.g. U.S. Pat. No. 4,269,748) or amine salts (see U.S. Pat. No. 4,292,226). Oxazolidines as well, as are used for example in U.S. Pat. No. 4,192,937, are blocked polyamines which can be used for chain extension of the prepolymers in preparing the polyurethanes of the invention. If blocked polyamines of this kind are used, they are generally mixed with the prepolymers in the absence of water and this mixture is then mixed with the water of dispersion, or some of the water of dispersion, so that the corresponding polyamines are liberated by hydrolysis.

It is preferred to use mixtures of diamines and triamines and, with particular preference, mixtures of isophoronediamine (IPDA) and diethylenetriamine (DETA).

The polyurethanes include preferably from 1 to 30 and, with particular preference, from 4 to 25 mol %, based on the overall amount of components (Ia2) and (Ia4), of a polyamine having at least 2 isocyanate-reactive amino groups, as monomers (d).

Alcohols with a functionality of more than 2 which can be used to establish a certain degree of branching or crosslinking are, for example, trimethylolpropane, glycerol and sucrose.

For the same purpose it is also possible as monomers (Ia4) to employ isocyanates having a functionality of more than two. Examples of commercially customary compounds are the isocyanurate or the biuret of hexamethylene diisocyanate.

Monomers (Ia5), whose use is optional, are monoisocyanates, monoalcohols and monoprimary and -secondary amines. Their proportion is generally not more than 10 mol %, based on the overall molar amount of the monomers. These monofunctional compounds usually have further functional groups, such as olefinic groups or carbonyl groups, and are used to introduce functional groups into the polyurethane which permit dispersion, crosslinking or subsequent polymer-analogous reaction of the polyurethane. Monomers suitable for this purpose are those such as isopropenyl-alpha,alpha-dimethylbenzylisocyanate (TMI) and esters of acrylic or methacrylic acid, such as hydroxyethyl acrylate or hydroxyethyl methacrylate.

In the field of polyurethane chemistry it is common knowledge how the molecular weight of the polyurethanes can be adjusted by choosing the proportions of the mutually reactive monomers and the arithmetic mean of the number of reactive functional groups per molecule.

The components (Ia1) to (Ia5) and their respective molar amounts are normally chosen such that the ratio A:B, where A) is the molar amount of isocyanate groups and
B) is the sum of the molar amounts of hydroxyl groups and of the functional groups which are able to react with isocyanates in an addition reaction, is from 0.5:1 to 2:1, preferably from 0.8:1 to 1.5 and, with particular preference, from 0.9:1 to 1.2:1. With very particular preference the ratio A:B is very close to 1:1.

The monomers (Ia1) to (Ia5) employed normally have on average from 1.5 to 2.5, preferably from 1.9 to 2.1 and, with particular preference, 2.0 isocyanate groups or functional groups which are able to react with isocyanates in an addition reaction.

The polyaddition of components (Ia1) to (Ia5) takes place in general at reaction temperatures from 20 to 180° C., preferably from 50 to 150° C., under atmospheric or the autogenous pressure.

The reaction times required may extend from a few minutes to several hours. It is known in the field of polyurethane chemistry how the reaction time is influenced by a large number of parameters such as temperature, monomer concentration and monomer reactivity.

The reaction of the diisocyanates can be accelerated using the customary catalysts, such as dibutyltin dilaurate, tin(II) octoate or diazabicyclo[2.2.2]octane.

Suitable polymerization apparatus includes stirred vessels, especially when solvents are used as well to ensure low viscosity and good heat dissipation.

Preferred solvents are of unlimited miscibility with water, have a boiling point from 40 to 100° C. under atmospheric pressure, and react slowly, if at all, with the monomers.

The dispersions are usually prepared by one of the following methods:

According to the acetone method, an ionic polyurethane is prepared from components (Ia1) to (Ia3) in a water-miscible solvent which boils at below 100° C under atmospheric pressure. The amount of water added is that required to form a dispersion in which water constitutes the coherent phase.

The prepolymer mixing method differs from the acetone method in that, rather than preparing a fully reacted (potentially) ionic polyurethane, a prepolymer is first of all prepared instead which has isocyanate groups. In this case the components are chosen such that the above-defined ratio A:B is greater than 1.0 to 3, preferably from 1.05 to 1.5. The prepolymer is first of all dispersed in water and then, if desired, is crosslinked, by reacting the isocyanate groups with amines having more than 2 isocyanate-reactive amino groups, or is chain-extended with amines having 2 isocyanate-reactive amino groups. Chain extension also takes place if no amine is added. In this case, isocyanate groups are hydrolyzed to form amino groups, which react with any remaining isocyanate groups of the prepolymers and so extend the chain.

If a solvent has been used in preparing the polyurethane, it is customary to remove the majority of the solvent from the dispersion by means, for example, of distillation under reduced pressure. The dispersions preferably have a solvent content of less than 10% by weight and with particular preference are free from solvents.

The dispersions generally have a solids content of from 10 to 75% by weight, preferably from 20 to 65% by weight, and a viscosity of from 10 to 500 mPas (measured at a temperature of 20° C. and a shear rate of 250 s$^{-1}$).

Hydrophobic auxiliaries, which in some cases are difficult to distribute homogeneously in the finished dispersion, examples being phenolic condensation resins formed from aldehydes and phenol and/or phenol derivatives, or epoxy resins, and other polymers specified, for example, in DE-A-39 03 538, 43 09 079 and 40 24 567, which are used, for example, as adhesion promoters in polyurethane dispersions, can be added to the polyurethane or the prepolymer prior to dispersion by the methods described in the two abovementioned documents.

In one variant of the invention, the disperse phase P.I contains the hydrophilic polyurethane Ibi and a carbodiimide Ibii in the form of a physical mixture.

The polyurethane Ibi can be composed in just the same way as the polyurethane Ia except that the polyurethane Ibi has no effective amounts of carbodiimide groups.

Correspondingly, the polyurethane Ibi is commonly built up from

Ibi1) diisocyanates which are free from carbodiimide structural units,
Ibi2) diols of which
  Ibi2.1) from 10 to 100 mol-%, based on the overall amount of the diols (Ibi2), have a molecular weight from 500 to 5000 and
  Ibi2.2) from 0 to 90 mol-%, based on the overall amount of the diols (Ibi2), have a molecular weight from 60 to 500 g/mol,
Ibi3) monomers which are different from the monomers (Ibi1) and (Ibi2) and have at least one isocyanate group or at least one isocyanate-reactive group and also at least one hydrophilic group or a potentially hydrophilic group which makes the polyurethanes dispersible in water,
Ibi4) if desired, other polyfunctional compounds, different from the monomers (Ibi1) to (Ibi3), having reactive groups which are alcoholic hydroxyl groups, primary or secondary amino groups or isocyanate groups, and
Ibi5) if desired, monofunctional compounds, different from the monomers (Ibi1) to (Ibi4), having a reactive group which is an alcoholic hydroxyl group, a primary or secondary amino group or an isocyanate group.

Particularly suitable structural components (Ibi1) are the compounds designated (Ia1.2), as structural components (Ib2) those designated as (Ia2), as structural components (Ibi3) those designated as (Ia3), as structural components (Ibi4) those designated as (Ia4), and as structural components (Ibi5) those designated as (Ia5).

The carbodiimide Ibii has essentially no hydrophilic groups which make it dispersible in water; that is, it has essentially no ionic groups or hydrophilic polyalkylene oxide radicals as possessed by the monomers Ia3 and/or Ibi3.

Examples of suitable carbodiimides Ibii are those of the general formula Ibii1

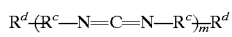   Ibii1 where n is a number from 2 to 20

$R^c$ is as defined in connection with the general formula Ia1.1.1

$R^d$ is

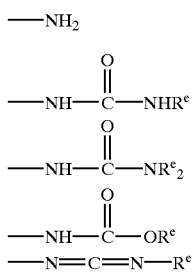

and $R^e$ independently at each occurrence is $C_1$–$C_{20}$-alkyl, $C_5$–$C_{12}$-cycloalkyl, $C_6$–$C_{20}$-aryl or $C_7$–$C_{20}$-aralkyl in which 1 to 4 hydrogen atoms of the radicals $R^e$ can be substituted by substituents which are inert toward carbodiimide groups.

Among these compounds, preference is given to those of the general formulae Ibii2 and Ibii3

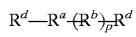   Ibii2 where $R^a$, $R^b$ and $R^d$ are as defined for the formulae Ia1.1.2 and Ibii1 and p is a number from 2 to 20,

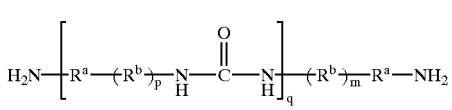   Ibii3 where $R^a$ and $R^b$ are as defined for the formula Ia1.1.2, p and m are a number from 2 to 20 and q is a number from 1 to 10.

The carbodiimides Ibii having terminal urea groups or urethane groups can be prepared, for example, by reacting compounds of the formula Ia1.1.1 with the corresponding alcohols or amines.

Compounds of this kind are known and are described, for example, in EP-A-628 541.

The carbodiimides Ibii having terminal groups of the type —N=C=N—$R^e$ are obtainable by condensing compounds of the formula Ia1.1.1 with the corresponding monoisocyanates or by cocondensing, together with the monoisocyanates, those diisocyanates used to synthesize the compounds of the formula Ia1.1.1. Preference is given to phenyl isocyanate, cyclohexyl isocyanate or m-isopropenyl-alpha, alpha-dimethylbenzyl isocyanate (TMI).

The preparation of an aqueous dispersion which comprises a disperse phase I containing the polyurethane Ibi and the carbodiimide Ibii in the form of a physical mixture can be carried out, for example, like the preparation of the polyurethanes Ia which comprise a hydrophobic auxiliary. This means that the carbodiimide Ibii, provided it has no isocyanate-reactive groups such as alcoholic hydroxyl or primary and secondary amino groups, can be added at any desired point in time to the reaction mixture from which the polyurethane Ibi is formed, provided that it is added prior to the dispersion of the polyurethane Ibi in water. If the carbodiimide Ibii has isocyanate-reactive groups, addition does not take place until after the reaction mixture has fully reacted, i.e., contains virtually no further NCO groups.

It is also possible to employ, instead of the carbodiimides Ibii, the monomers Ia1.1, provided they are added after the reaction mixture made up of the monomers Ibi1 to Ibi5 has fully reacted. In this case, the isocyanate groups of the monomers Ia1.1 react with water to form amino groups and these amino groups may react with further isocyanate groups of further molecules of the monomers Ia1.1, with formation of urea groups, to form chain-extended molecules.

Carboxylic acids suitable for use as the polycarboxylic acid II present in the coherent aqueous phase (P.II) are virtually all carboxylic acids having 2 or more carboxyl groups and no carbodiimide groups and a solubility of more than one, preferably more than 25 g/l at 25° C. in the coherent phase P.II.

In addition, the solubility of preferred polycarboxylic acids at 25° C. in water is at least 100, preferably 200 and, with particular preference, at least 300 g/kg of water if the pH is raised to more than 6 by adding sodium hydroxide. A key property of these polycarboxylic acids is that the light transmission of the abovementioned solutions, measured in undiluted form at room temperature and at a path length of 2.5 cm relative to water, is essentially 100%.

In the dispersions of the invention, the carbodiimide groups in the disperse phase I and the carboxyl groups in the coherent aqueous phase II are preferably present in equivalent amounts.

The molecular weight of these polycarboxylic acids II lies in general from 200 to 1,000,000, preferably from 400 to 100,000 and, with particular preference, from 1000 to 10,000.

The number of carboxyl groups per polycarboxylic acid molecule is usually from 2 to 150.

Preference is given to those aqueous dispersions of the invention in which the coherent phase P.II comprises as polycarboxylic acid II IIa) a polycarboxylic acid (IIa) which is derived from
  IIa1) from 50 to 100% by weight of a $C_3$–$C_{12}$ carboxylic acid having an olefinic double bond and
  IIa2) from 0 to 50% by weight of principal monomers selected from $C_1$–$C_{20}$-alkyl(meth)acrylates, vinyl esters of carboxylic acids with up to 20 carbons, vinylaromatic compounds with up to 20 carbons, ethylenically unsaturated nitriles, vinyl halides, and aliphatic hydrocarbons with 2 to 8 carbons and 1 or 2 double bonds, and
  IIa3) from 0 to 10% by weight of other free-radically polymerizable monomers different from (IIa1) and (IIa2).

In the context of the polymers (IIa) (meth)acryl- is an abbreviated form of methacryl- or acryl-.

Suitable monomers IIa1 are principally (meth)acrylic acid or maleic acid. Particular preference is given to those polycarboxylic acids which are prepared only from the monomers IIa1 and, with very particular preference, only from acrylic acid.

In the case of the use of monomers having carboxylic anhydride groups, a judicious procedure is first to polymerize these monomers and then to hydrolyze the anhydride groups.

The polycarboxylic acids are generally prepared by free-radical addition polymerization. Suitable methods of polymerization, such as bulk or solution polymerization, are known to the skilled worker.

The dispersions of the invention can be prepared with particular ease by preparing a dispersion which comprises the disperse phase (I) and an aqueous solution of the polycarboxylic acid II separately and then mixing them with one another. Instead of the aqueous solution of the polycarboxylic acid II it is also possible to employ the polycarboxylic acid II in bulk. Mixing is not critical and can be carried out, for example, by stirring the aqueous solution of the polycarboxylic acid or the undiluted polycarboxylic acid into the dispersion. Mixing can take place at any desired point in time prior to the use of the dispersion.

The polyurethane dispersions of the invention may include further water-emulsifiable or water-dispersible resins, such as polyurethanes and polyester, epoxy or alkyd resins, and also customary commercial auxiliaries and additives, such as propellants, defoamers, emulsifiers, thickeners, thixotropic agents, and colorants, such as dyes and pigments. Normally, however, the dispersions of the invention contain no effective amounts of melamine, kaolin or flame retardants.

They are suitable, for example, for adhesively bonding or coating a variety of substrates, such as wood, metal, plastics, paper, leather or textiles, for impregnating textiles, and for producing moldings and printing inks.

For these applications the polyurethane dispersions of the invention can be processed using the techniques widespread in the adhesives, leather or coatings industries, i.e. by spraying, rolling or knife-coating the dispersions onto the substrate and then drying them.

Where the dispersions are processed as adhesives, the coated workpieces are mated, preferably under pressure, with another workpiece either prior to the drying of the dispersion film or after drying.

Particularly firm adhesive bonds are obtained if workpieces which have been provided with a dried adhesive film are heated, directly prior to, during or after mating, to about 50 to 100° C.

The adhesive bonds produced by these methods are particularly notable for their stability on storage and their high thermal stability.

Experimental Section
Abbreviations:

| | |
|---|---|
| CDI | Carbodiimide groups |
| OHN | Hydroxyl number |
| TDI | Tolylene diisocyanate |
| HDI | Hexamethylene diisocyanate |
| DBTL | Dibutyltin dilaurate |
| DMPA | Dimethylolpropionic acid |
| RT | Room temperature |

The examples used the carbodiimide of the following formula

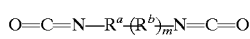                               Ia1.1.2 where m is on average approximately 4.

The viscosities of the dispersions were measured at 20° C. at a shear rate of 250 s$^{-1}$ using a rotary rheometer with concentric cylinders (spindle diameter 38.7 mm, cup diameter 42.0 mm).

The size of the latex particles was determined indirectly by way of turbidity measurements. For this purpose, the turbidity of a dispersion having a solids content of 0.01% by weight was determined relative to distilled water, at room temperature and with a path length of 2.5 cm.

$$LT = \frac{intensity_{disp.} \times 100}{intensity_{water}}$$

Determining the K value

The K value is a measure of the molecular weight of a polymer and was determined by the method described in Kirk-Othmer, Encyclopedia of Chemical Technology, 3rd Edition, John Wiley & Sons, Inc., volume 23, p.967.

A Preparing the Dispersions
A1 Preparing the Initial Dispersions
Dispersion Ia1: Dispersion with Carbodiimide 542.9 g of a polyester prepared from adipic acid, neopentyl glycol and hexanediol (OHN=56), 0.1 g of DBTL and 36.6 g of 1,4-butanediol were reacted in 92.2 g of acetone with 58.6 g of TDI at 65° C. for 1 h. Then 88.3 g of an NCO-terminated carbodiimide containing 8% NCO and 15% CDI in 100 g of acetone were added. After 10 minutes, 56.5 g of HDI were metered in and the mixture was stirred at 65° C. for 153 minutes. It was diluted with 756 g of acetone and cooled to 50° C. The NCO content was 0.38%. It was chain-extended with 33.8 g of a 50% strength aqueous solution of sodium aminoethylaminoethanesulfonate and dispersed with 1200 g of deionized water. The acetone was distilled off under reduced pressure at up to 43° C. and the solids content was adjusted to 40%.

Analytical data: LT: 69 Visc.: 32 mPas K value: 51 pH: 8.8

Dispersion Ia2: Dispersion with Carbodiimide 563.2 g of a polyester prepared from adipic acid, neopentyl glycol and hexanediol (OHN=56), 0.1 g of DBTL and 38 g of 1,4-butanediol were reacted in 191.4 g of acetone with 63.4 g of TDI at 62° C. for 1 h. Then 57.3 g of an NCO-terminated carbodiimide containing 8% NCO and 15% CDI in 100 g of acetone were added. After 10 minutes, 61.2 g of HDI were metered in and the mixture was stirred at 65° C. for 139 minutes. It was diluted with 756 g of acetone and cooled to 50° C. The NCO content was 0.41%. It was chain-extended with 33.8 g of a 50% strength solution of sodium aminoethylaminoethanesulfonate and dispersed with 1200 g of deionized water. The acetone was distilled off under reduced pressure at up to 43° C. and the solids content was adjusted to 40%.

Analytical data: LT: 78 Visc.: 46 mPas K value: 58 pH: 8.3

Dispersion Ia3: Dispersion with Carbodiimide 552.6 g of a polyester prepared from adipic acid, neopentyl glycol and hexanediol (OHN=56), 0.1 g of DBTL and 37.3 g of 1,4-butanediol were reacted in 191.4 g of acetone with 60.9 g of TDI at 65° C. for 1 h. Then 73.5 g of an NCO-terminated carbodiimide containing 8% NCO and 15% CDI in 100 g of acetone were added. After 10 minutes, 58.8 g of HDI were metered in and the mixture was stirred at 65° C. for 140 minutes. It was diluted with 756 g of acetone and cooled to 50° C. The NCO content was 0.41%. It was chain-extended with 33.8 g of a 50% strength solution of sodium aminoethylaminoethanesulfonate and dispersed with 1200 g of deionized water. The acetone was distilled off under reduced pressure at up to 43° C. and the solids content was adjusted to 40%.

Analytical data: LT: 80 Visc.: 50 mPas K value: 53 pH: 7.8

A2 Preparing the Latent-crosslinking Dispersions and Films thereof

The polycarboxylic acid used was a polyacrylic acid solution having a number-average molecular weight of (Mn)=2750, 45% strength in water, pH=7

EXAMPLE 1

6.7 g of polycarboxylic acid solution were added dropwise with vigorous stirring to 250 g of the dispersion 1.

EXAMPLE 2

4.4 g of polycarboxylic acid solution were added dropwise with vigorous stirring to 250 g of the dispersion 2.

EXAMPLE 3

5.6 g of polycarboxylic acid solution were added dropwise with vigorous stirring to 250 g of the dispersion 3.

The K value of the latent-crosslinking dispersions (Examples 1 to 3) and the initial dispersions (dispersions 1 to 3) was measured at different times before and after filming. The films were prepared by drying at 40° C. for 3 days. The K value of the dry film was measured in turn. The dispersion mixtures were stored at RT and the measurements were repeated after 3 months.

The results of testing can be seen from Table 1

TABLE 1

| Dispersion | K value dispersion | K value film | K value dispersion after 3 months | K value film of dispersion after 3 months |
|---|---|---|---|---|
| Dispersion 1 | 51.5 | 51.6 | 55.4 | |
| Dispersion 2 | 58.1 | 60.8 | 56.7 | |
| Dispersion 3 | 52.6 | 53.2 | 57.2 | |
| Example 1 | 56.1 | undissolved | 64.5 | undissolved |
| Example 2 | 58 | undissolved | 58 | undissolved |
| Example 3 | 57.7 | undissolved | 58 | undissolved |

We claim:

1. A latent-crosslinking aqueous polyurethane dispersion comprising:

I) a disperse phase (P.I) comprising
  Ia) a polyurethane (Ia) which has hydrophilic groups which make it dispersible in water and also has carbodiimide groups but essentially no carboxyl groups; or
  Ib) a physical mixture of
    Ibi) a polyurethane (Ibi) which has hydrophilic groups which make it dispersible in water but has essentially no carbodiimide or carboxyl groups, and
    Ibii) a carbodiimide (Ibii) which has essentially no hydrophilic groups which make it dispersible in water; and
II) a coherent aqueous phase (P.II) comprising a dissolved form of a polycarboxylic acid II which has no carbodiimide groups but has a solubility of at least 1 g/l at 25° C. in said coherent aqueous phase P.II, wherein said polyurethane (Ia) and said polyurethane (Ibi) comprise diisocyanates and diols, wherein said diols contain no sulfonate groups and
  i) from 10 to 100 mol % of said diols, based on the overall amount of diols, have a molecular weight from 500 to 5000 g/mol, and
  ii) from 0 to 90 mol % of said diols, based on the overall amount of diols, have a molecular weight from 60 to 500 g/mol.

2. The aqueous dispersion as claimed in claim 1, wherein said carbodiimide groups are introduced into said polyurethane (Ia) by way of polyisocyanates (Ia1) of the general formula Ia1.1.1

(Ia1.1.1)

where $R^c$ is a divalent hydrocarbon radical with or without urea, urethane, ester, and/or ether groups, as is obtained by removing the isocyante groups from a simple organic isocyanate or from a prepolymer which carries terminal isocyanate groups and has urethane groups with or without ester or ether groups and where, if there are two or more radicals $R^c$ in the same molecule, it is possible for different radicals $R^c$ meeting said definition to be present simultaneously, and n is from 1 to 20.

3. An aqueous dispersion as claimed in claim 1 or 2, wherein the carbodiimide structural units are introduced into the polyurethane (Ia) by way of polyisocyanates (Ia1) of the general formula Ia1.1.2

Ia1.1.2 where $R^a$ is a group of the formula Ia1.1.2.1

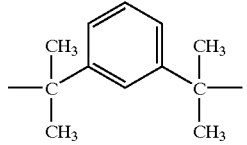

Ia1.1.2.1

$R^b$ is a group of the formula Ia1.1.2.2

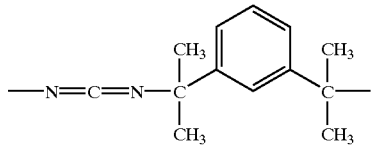

Ia1.1.2.2 and m is a number from 1 to 20.

4. An aqueous dispersion as claimed in any one of claims 1 to 3, wherein the phase (P.I) is formed essentially from a polyurethane (Ia) which has been built up from
  Ia1) diisocyanates which comprise
    Ia1.1) carbodiimide structural units and, if desired, those which
    Ia1.2) are free from carbodiimide structural units,
  Ia2) diols of which
    Ia2.1) from 10 to 100 mol-%, based on the overall amount of the diols (Ia2), have a molecular weight from 500 to 5000 and
    Ia2.2) from 0 to 90 mol-%, based on the overall amount of the diols (Ia2), have a molecular weight from 60 to 500 g/mol, Ia3) monomers which are different from the monomers (Ia1) and (Ia2) and have at least one isocyanate group or at least one isocyanate-reactive group and also at least one hydrophilic group or a potentially hydrophilic group which makes the polyurethanes dispersible in water, Ia4) if desired, other polyfunctional compounds, different from the monomers (Ia1) to (Ia3), having reactive groups which are alcoholic hydroxyl groups, primary or secondary amino groups or isocyanate groups, and Ia5) if desired, monofunctional compounds, different from the monomers (Ia1) to (Ia4), having a reactive group which is an alcoholic hydroxyl group, a primary or secondary amino group or an isocyanate group.

5. An aqueous dispersion as claimed in any one of claims 1 to 4, wherein the polyurethane (Ibi) has been built up from Ibi1) diisocyanates which are free from carbodiimide structural units, Ibi2) diols of which Ibi2.1) from 10 to 100 mol-%, based on the overall amount of the diols (Ibi2), have a molecular weight from 500 to 5000 and Ibi2.2) from 0 to 90 mol-%, based on the overall amount of the diols (Ibi2), have a molecular weight from 60 to 500 g/mol, Ibi3) monomers which are different from the monomers (Ibi1) and (Ibi2) and have at least one isocyanate group or at least one isocyanate-reactive group and also at least one hydrophilic group or a potentially hydrophilic group which makes the polyurethanes dispersible in water, Ibi4) if desired, other polyfunctional compounds, different from the monomers (Ibi1) to (Ibi3), having reactive groups which are alcoholic hydroxyl groups, primary or secondary amino groups or isocyanate groups, and Ibi5) if desired, monofunctional compounds, different from the monomers (Ibi1) to (Ibi4), having a reactive group which is an alcoholic hydroxyl group, a primary or secondary amino group or an isocyanate group.

6. An aqueous dispersion as claimed in any one of claims 1 to 4, wherein the carbodiimide Ibii is of the general formula Ibii1

$$R^d-(R^c-N=C=N-R^c)_n R^d \quad \text{Ibii1}$$

where n is a number from 2 to 20

$R^c$ is as defined in connection with the general formula Ia1.1.1

$R^d$ is

—NH$_2$

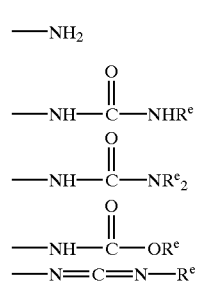

and $R^e$ independently at each occurrence is $C_1$–$C_{20}$-alkyl, $C_5$–$C_{12}$-cycloalkyl, $C_6$–$C_{20}$-aryl or $C_7$–$C_{20}$-aralkyl in which 1 to 4 hydrogen atoms of the radicals $R^e$ can be substituted by substituents which are inert toward carbodiimide groups.

7. An aqueous dispersion as claimed in claim 5, wherein the carbodiimide Ibii1 is of the general formula Ibii2 or Ibii3

$$R^d-R^a-(R^b)_p R^d \quad \text{Ibii2}$$

where $R^a$, $R^b$ and $R^d$ are as defined for the formulae Ia1.1.2 and Ibii1 and p is a number from 2 to 20 or of the general formula Ibii3

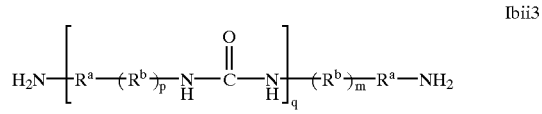

where $R^a$ and $R^b$ are as defined for the formula Ia1.1.2, p and m are a number from 2 to 20 and q is a number from 1 to 10.

8. An aqueous dispersion as claimed in any one of claims 1 to 7, wherein the polycarboxylic acid II is IIa) a polycarboxylic acid (IIa) which is derived from IIa1) from 50 to 100% by weight of a $C_3$–$C_{12}$ carboxylic acid having an olefinic double bond and IIa2) from 0 to 50% by weight of principal monomers selected from $C_1$–$C_{20}$-alkyl(meth)acrylates, vinyl esters of carboxylic acids with up to 20 carbons, vinylaromatic compounds with up to 20 carbons, ethylenically unsaturated nitrites, vinyl halides, and aliphatic hydrocarbons with 2 to 8 carbons and 1 or 2 double bonds, and IIa3) from 0 to 10% by weight of other free-radically polymerizable monomers different from (IIa1) and (IIa2).

9. An aqueous dispersion as claimed in claim 8, wherein the polycarboxylic acid IIa has been built up only from monomers IIa1.

10. An article of wood, metal, textile, leather or plastic which is impregnated, coated or adhesively bonded with an aqueous dispersion as claimed in any one of claims 1 to 9.

11. The aqueous dispersion as claimed in claim 2, wherein n is from 2 to 10.

12. An impregnant comprising the aqueous dispersion of claim 1.

13. A coating composition comprising the aqueous dispersion of claim 1.

14. An adhesive comprising the aqueous dispersion of claim 1.

15. The latent-crosslinking aqueous polyurethane dispersion of claim 1, wherein said diols are diols selected from the group consisting of polyester diols, polycarbonatediols, lactone-based polyesterdiols, polyetherdiols, and polyhydroxyolefins.

16. The latent-crosslinking aqueous polyurethane dispersion of claim 15, wherein said polyester diols are selected from the groups consisting of polyester diols obtained by reacting at least one dihydric alcohol with at least one dicarboxylic acid, polyester diols obtained obtained by reacting at least one dihydric alcohol with at least one dicarboxylic anhydride, polyester diols obtained obtained by reacting at least one dihydric alcohol with at least one dicarboxylic ester, and mixtures thereof.

17. The latent-crosslinking aqueous polyurethane dispersion of claim 15, wherein said polycarbonatediols are obtained by reacting phosgene with an excess of a low molecular weight alcohol.

18. The latent-crosslinking aqueous polyurethane dispersion of claim 15, wherein said lactone-based polyesterdiols are homopolymers or copolymers of lactones.

19. The latent-crosslinking aqueous polyurethane dispersion of claim 15, wherein said lactone-based polyesterdiols are hydroxy-terminated adducts of lactones with difunctional starter molecules.

20. The latent-crosslinking aqueous polyurethane dispersion of claim 18, wherein said lactones are derived from compounds of the general formula HO—(CHR)$_z$—COOH wherein z is an integer from 1 to 20, and R is selected from the group consisting of hydrogen or $C_1$–$C_4$-alkyl radical.

21. The latent-crosslinking aqueous polyurethane dispersion of claim 19, wherein said lactones are derived from compounds of the general formula HO—(CHR)$_z$—COOH wherein z is an integer from 1 to 20, and R is selected from the group consisting of hydrogen or $C_1$–$C_4$-alkyl radical.

22. The latent-crosslinking aqueous polyurethane dispersion of claim 18, wherein said lactones are selected from the group consisting of epsilon-caprolactone, beta-caprolactone, gamma-caprolactone, methyl-epsilon caprolactone, and mixtures thereof.

23. The latent-crosslinking aqueous polyurethane dispersion of claim 19, wherein said lactones are selected from the group consisting of epsilon-caprolactone, beta-caprolactone, gamma-caprolactone, methyl-epsilon caprolactone, and mixtures thereof.

24. The latent-crosslinking aqueous polyurethane dispersion of claim 19, wherein said difunctional starter molecules are selected from the group consisting of bis(hydroxymethyl)cyclohexanes or alcohols of the formula HO—(CH$_2$)$_x$—OH wherein x is an integer from 1 to 20.

25. The latent-crosslinking aqueous polyurethane dispersion of claim 24, wherein x is an even integer from 2 to 20.

26. The latent-crosslinking aqueous polyurethane dispersion of claim 19, wherein said difunctional starter molecules are selected from the group consisting of ethylene glycol, propane-1,2-diol, propane-1,3-diol, butane-1,3-diol, butene-1,4-diol, butyne-1,4-diol, pentane-1,5-diol, neopentyl glycol, 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol, and polybutylene glycol.

27. The latent-crosslinking aqueous polyurethane dispersion of claim 16, wherein said dihydric alcohol is at least one dihydric alcohol selected from the group consisting of bis(hydroxymethyl)cyclohexanes or alcohols of the formula HO—(CH$_2$)$_x$—OH wherein x is an integer from 1 to 20.

28. The latent-crosslinking aqueous polyurethane dispersion of claim 27, wherein x is an even integer from 2 to 20.

29. The latent-crosslinking aqueous polyurethane dispersion of claim 16, wherein said dihydric alcohol is at least one dihydric alcohol selected from the group consisting of ethylene glycol, propane-1,2-diol, propane-1,3-diol, butane-1,3-diol, butene-1,4-diol, butyne-1,4-diol, pentane-1,5-diol, neopentyl glycol, 1,4-bis(hydroxymethyl)cyclohexane, 2-methylpropane-1,3-diol, hexane-1,6-diol, octane-1,8-diol, dodecane-1,12-diol, methylpentanediols, diethylene glycol, triethylene glycol, tetraethylene glycol, polyethylene glycol, dipropylene glycol, polypropylene glycol, neopentyl glycol, dibutylene glycol, and polybutylene glycol.

30. The latent-crosslinking aqueous polyurethane dispersion of claim 16, wherein said dicarboxylic acid is at least one dicarboxylic acid selected from the group consisting of an aliphatic dicarboxylic acid, a cycloaliphatic dicarboxylic acid, an araliphatic dicarboxylic acid, an aromatic dicarboxylic acid, a heterocyclic dicarboxylic acid, and substituted derivatives thereof.

31. The latent-crosslinking aqueous polyurethane dispersion of claim 16, wherein said dicarboxylic acid is a dicarboxylic acid of the formula HOOC—(CH$_2$)$_y$—COOH wherein y is an integer from 1 to 20.

32. The latent-crosslinking aqueous polyurethane dispersion of claim 31, wherein y is an even integer from 2 to 20.

33. The latent-crosslinking aqueous polyurethane dispersion of claim 16, wherein said dicarboxylic acid is at least one dicarboxylic acid selected from the group consisting of suberic acid, azelaic acid, phthalic acid, maleic acid, fumaric acid, succinic acid, adipic acid, sebacic acid, dodecanedicarboxylic acid, and isophthalic acid.

34. The latent-crosslinking aqueous polyurethane dispersion of claim 16, wherein said dicarboxylic anhydride is at least dicarboxylic anhydride selected from the group consisting of phthalic anhydride, tetrahydrophthalic anhydride, hexahydrophthalic anhydride, tetrachlorophthalic anhydride, endomethylenetetrahydrophthalic anhydride, glutaric anhydride, and maleic anhydride.

35. The latent-crosslinking aqueous polyurethane dispersion of claim 17, wherein said low molecular weight alcohol is selected from the groups consisting of ethylene glycol, propane-1,2-diol, propane-1,3-diol, butane-1,3-diol, butene-1,4-diol, butyne-1,4-diol, pentane-1,5-diol, neopentyl glycol, 1,4-bis(hydroxymethyl) cyclohexane, 2-methylpropane-1,3-diol, hexane-1,6-diol, octane-1,8-diol, dodecane-1,1 2-diol, methylpentanediols, diethylene glycol, triethylene glycol, tetraethylene glycol, polyethylene glycol, dipropylene glycol, polypropylene glycol, neopentyl glycol, dibutylene glycol, and polybutylene glycol.

36. The latent-crosslinking aqueous polyurethane dispersion of claim 17, wherein said dicarboxylic acid is a dicarboxylic acid of the formula HOOC—(CH$_2$)$_y$—COOH wherein y is an integer from 1 to 20.

37. The latent-crosslinking aqueous polyurethane dispersion of claim 36, wherein y is an even integer from 2 to 20.

* * * * *